United States Patent [19]

Ritzerfeld

[11] 4,009,956

[45] Mar. 1, 1977

[54] ELECTROSTATIC OR XEROGRAPHIC COPYING OR DUPLICATING MACHINE WITH BUILT-IN ARRANGEMENT FOR CUTTING A SHEET ALONG A SELECTED LINE OR LINES

[76] Inventor: Gerhard Ritzerfeld, Schorlemer Allee 14, 1000 Berlin 33, Germany

[22] Filed: Sept. 11, 1975

[21] Appl. No.: 612,579

[30] Foreign Application Priority Data

Sept. 18, 1974 Germany .......................... 2445153

[52] U.S. Cl. ...................................... 355/13; 83/482

[51] Int. Cl.[2] .................. G03G 15/00; B23D 19/00

[58] Field of Search ............... 355/13; 83/482, 433, 83/408

[56] References Cited

UNITED STATES PATENTS

| | | | |
|---|---|---|---|
| 2,554,027 | 5/1951 | Haswell | 83/482 |
| 3,728,925 | 4/1973 | Peters | 83/482 X |
| 3,855,890 | 12/1974 | Lynch et al. | 83/482 X |

*Primary Examiner*—Richard L. Moses
*Attorney, Agent, or Firm*—Michael J. Striker

[57] ABSTRACT

An original to be copied is supported in a predetermined position. A sheet of copying paper is transported through the copying or duplicating machine in a predetermined travel direction along a predetermined travel path and into a delivery station. The original is illuminated and an image thereof is formed on the sheet of copying paper as the sheet travels along the path. A cutting arrangement is arranged upstream of the delivery station and is operative when activated for cutting the sheet along a line extending parallel to the travel direction of the sheet as the sheet leaves the copying station and travels to the delivery station. The cutting arrangement is activatable by the user of the machine.

5 Claims, 2 Drawing Figures

ELECTROSTATIC OR XEROGRAPHIC COPYING OR DUPLICATING MACHINE WITH BUILT-IN ARRANGEMENT FOR CUTTING A SHEET ALONG A SELECTED LINE OR LINES

BACKGROUND OF THE INVENTION

The invention relates to electrostatic and xerographic copying and duplicating machines.

More particularly, the invention relates to such machines in which the original or master to be copied or multiplied is laid face down, with a proper orientation of its image, upon a transparent support surface, e.g., a glass plate, with the support surface being provided with two masks or originals together forming a slit, the masks or originals possibly being arranged in transparent plastic jackets. Above such slit-defining originals or masks a further original is arranged, possibly contained in a plastic jacket. The further original is shiftably supported so that successive lines of the image thereon, if printed material constitutes the image, will move into the zone of the slit and thereby become unblocked for copying.

With such machines the copying sheets employed if of the usual size are as a rule only partially utilized, since in general only a fractional section of the image on the original is to be copied or multiplied. Normally these copying machines are designed to accept copying sheets of only one size, so that the use of sheets having a different size appropriate for the size of the section on the original actually to be copied is not possible. The structural modifications of such a machine which would be necessary to render it capable of processing sheets of a plurality of sizes would be very considerable and are therefore not made.

As a result, either the copying sheets discharged by the machine will have empty spaces of various sizes, or to better utilize the copying sheets a plurality of unrelated images will be formed on a single copying sheets by suitably arranging a plurality of originals on the support surface. In either case, it is necessary to subsequently perform a manual cutting operation upon the copying sheets, either to cut off the empty spaces in the first case, or to separate from one another those portions of the copying sheet bearing the respective unrelated images. This subsequent cutting operation is time-consuming, and for that reason expensive in terms of labor, and sometimes requires skill and precision beyond that possessed by the user of the copying machine.

SUMMARY OF THE INVENTION

It is a general object of the invention to make unnecessary the subsequent manual cutting of the copying sheets just referred to.

This object, and others which will become more understandable from the description, below, of a preferred embodiment, can be met, according to one advantageous concept of the invention, by providing in the travel path of the copying sheets, intermediate the fixing arrangement and the delivery station of the copying machine, a plurality of cutting units each operative for cutting the copying sheets along a respective one of a plurality of cut lines extending parallel to the sheet travel direction. The cutting units are preferably pairs of cooperating rotating cutting knives. For selecting certain sheet formats the individual cutting units preferably can be individually and independently brought into their operative positions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
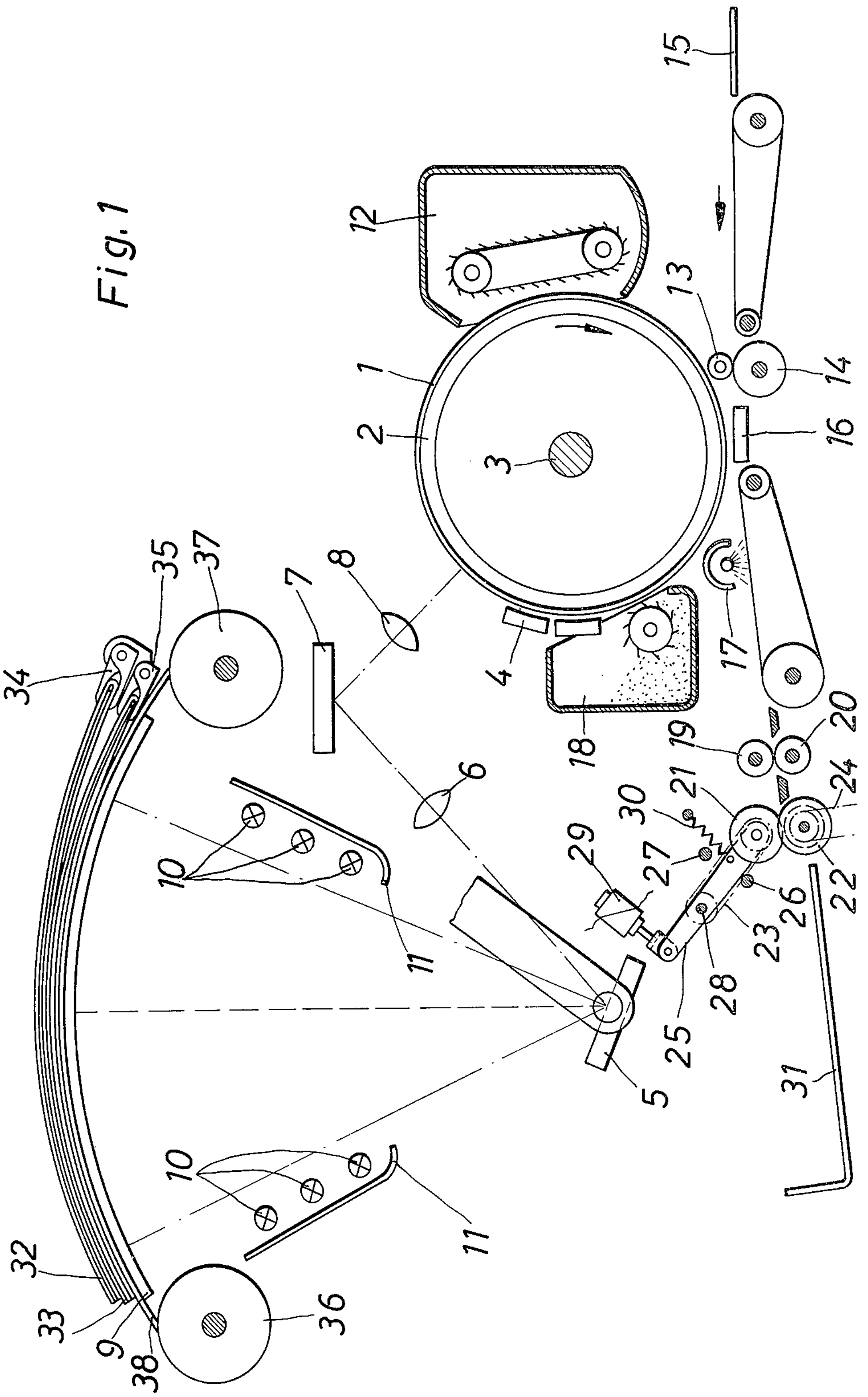
FIG. 1 depicts a xerographic copying machine provided with a cutting arrangement, shown in a simplified view.

The xerographic copying machine shown in FIG. 1 includes a drum 2 provided with a selenium layer 1 and rotated about the axle 3 by means of a non-illustrated drive. Arranged at the outer periphery of drum 2 is a charging unit 4 which extends over the whole axial length of the drum. The charging unit 4 imparts a charge to the selenium layer 1. By means of a pivoting mirror 5, an optical system 6, a stationary mirror 7 and a further optical system 8, a reflected image of the original resting on the support surface 9 is cast onto the selenium layer 1, in a manner well known in the art. The illumination of the originals is performed by lamps 10 and cooperating reflectors 11.

The pivoting mirror 5 is moved in synchronism with the rotation of the drum 2 and casts an image of the unblocked portion of the original onto the selenium layer 1. Those portions of the previously charged selenium layer 1 which are exposed to light become discharged, so that charge remains only at the image locations. As the drum 2 turns further, the charged image locations of the selenium layer 1 enter the operating zone of the powder applying device 12. The device 12 applies powder to the selenium layer 1, but the powder adheres only to the charged image locations.

A sheet 15 of copying paper fed into the feed rollers 13, 14 is transported past and in contact with the drum during a predetermined time interval within the machine operating cycle, and by means of a recharging arrangement 16 the powder image is transferred from the selenium layer 1 into the sheet 15. Thereafter, the sheet 15 with the properly oriented powder image thereon passes a fixing station at which the powder image is fused by means of an infrared radiator 17. The selenium layer 1 is freed of any powder still adhering to it at a cleaning station 18, before being recharged.

After passing the fixing station, the sheet 15 is guided by transport rollers 19, 20 to a plurality of cutting units. The individual cutting units are arranged one next to the other, spaced from each other in direction transverse to the sheet travel direction (i.e., are spaced from each other in direction normal to the picture plane of FIG. 1). Each cutting unit is operative for cutting the sheet 15 along a respective cut line extending parallel to the sheet travel direction. The cutting units are disposed along the whole breadth of the travelling sheet, spaced apart for example by convenient units, such as 1 inch. The number of cutting units employed is selected in dependence upon the desired number of sheet-cutting possibilities or copying formats contemplated.

Figure 2:
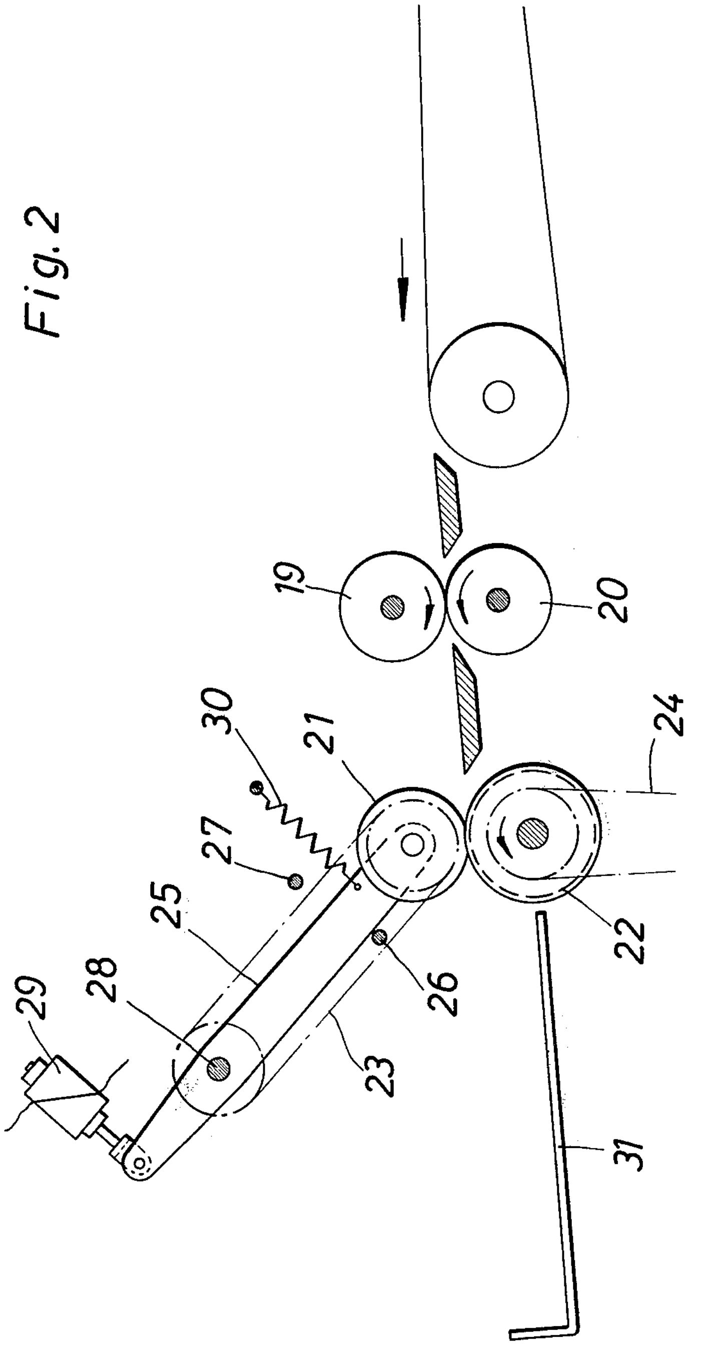
FIG. 2 depicts the cutting arrangement of FIG. 1 on a larger scale.

In FIGS. 1 and 2 only one cutting unit is shown, it being understood that the others are exactly identical and arranged exactly behind the illustrated one, as viewed in the FIGS.

Each cutting unit is comprised of two cooperating rotating cutting knives 21, 22 arranged one above the other. The two cutting knives are driven by a non-illustrated motor via drive belts 23 and 24 in the same direction as are the transport rollers 19 and 20. The upper cutting knife 21 is mounted on a frame 25 which is pivotably mounted about an axle 28 between two stops 26, 27. When an electromagnet 29 connected to the frame 25 is energized, the frame abuts against the stop 26, as depicted in FIGS. 1 and 2. In this position, the two cutting knives 21, 22 are so arranged relative to each other that a sheet 15 travelling through the cutting arrangement will be cut along the cut line associated with this particular cutting unit, the cut line extending along the travel path of the sheet 15. When the electromagnet 29 is not energized, the frame 25 is pulled by a tension spring 30 against the stop 27. In this position, the cutting knives 21, 22 are separated from each other to such an extent that a sheet passing through the cutting arrangement will not be cut along the cut line associated with this particular cutting unit of the cutting arrangement.

By selectively energizing different individual electromagnets 29 the sheet 15 is caused to be cut at one or more selected places before being deposited at the delivery station 31. The control of the electromagnets 29 is preferably performed by means of pushbuttons activated by the user of the machine, with each electromagnet 29 being energizable under the control of a respective one of the pushbuttons. The pushbuttons can each consist essentially of a switch connected in the power supply current path for the respective electromagnet 29.

The originals are located in transparent jackets 32, 33 with their printed images facing towards the support surface 9. The transparent jackets 32, 33 in turn are secured to clamping arrangements 34, 35 arranged at the edge of the support surface 9 and extending over the whole length of the support surface. Alternatively, the originals could be held by the clamping arrangements directly. Arranged in the lower jacket 33 are two originals, or an original and a mask, which together define a slit extending in the scanning direction of the pivoting mirror 5. A part of the original located in the upper jacket 32 is viewable through this slit from below. The clamping arrangement 34 is longitudinally shiftable (i.e., shiftable in direction normal to the picture plane of FIG. 1), so that with it the upper original can be shifted and different portions of the original positioned at the slit and projected onto the selenium layer 1.

Arranged on two spools 36, 37 is a transparent foil band 38 which can be shifted between the spools. The foil band 38 carries various masks or components of printed forms to be combined with the printing appearing in the slit, with each being brought in between the support surface 9 and the lower jacket 33 and the visible part of the original being projected onto the selenium layer 1.

It will be understood that each of the elements described above, or two or more together, may also find a useful application in other types of constructions differing from the types described above.

While the invention has been illustrated and described as embodied in a xerographic copier comprised of a xerographic drum, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An electrostatic or xerographic copying or duplicating machine, comprising, in combination, supporting means for supporting an original to be copied in a predetermined position; a delivery station for copies; transport means for transporting a sheet of copying paper through the machine in a predetermined travel direction along a predetermined travel path and into said delivery station; copying means for illuminating the original and forming an image thereof on the sheet of copying paper as the latter travels along said path; cutting means arranged upstream of said delivery station, said cutting means comprising a plurality of cutter units spaced from each other in direction transverse to the sheet travel direction and each operative when activated for cutting the sheet along a respective one of a plurality of different cut lines each extending parallel to the travel direction as the sheet leaves said copying means and travels to said delivery station; and activating means operable by the user of the machine for activating said cutting means, said activating means comprising means for selecting the line along which the sheet is to be cut.

2. The machine defined in claim 1, wherein the copying means further includes a fixing arrangement for fixing the image formed on the sheet, and wherein said cutting means is arranged intermediate said fixing arrangement and said delivery station.

3. An electrostatic or xerographic copying or duplicating machine, comprising, in combination, supporting means for supporting an original to be copied in a predetermined position; a delivery station for copies; transport means for transporting a sheet of copying paper through the machine in a predetermined travel direction along a predetermined travel path and into said delivery station; copying means for illuminating the original and forming an image thereof on the sheet of the copying paper as the latter travels along said path; cutting means arranged upstream of said delivery station, said cutting means comprising a plurality of cutter units spaced from each other in direction transverse to the sheet travel direction and each operable when activated for cutting the sheet along a respective one of a plurality of different cut lines each extending parallel to the travel direction as the sheet leaves said copying means and travels to said delivery station, each of said cutter units comprising a pair of cooperating rotating cutting knifes; and activating means operable by the user of the machine for activating said cutting means.

4. An electrostatic or xerographic copying or duplicating machine, comprising, in combination, supporting means for supporting an original to be copied in a predetermined position, said supporting means comprising a transparent support body and masking means for blocking all but a predetermined section of an original supported on the transparent support body, and shifting means for shifting the original relative to said masking means in a direction such as to cause a shift in the portion of the sheet upon which an image is formed, the shift being in direction transverse to the sheet travel direction; a delivery station for copies; transport means for transporting a sheet of copying paper through the machine in a predetermined travel direction along a predetermined travel path and into said delivery station; copying means for illuminating the original and forming an image thereof on the sheet of copying paper as the latter travels along said path; cutting means arranged upstream of said delivery station and operative when activated for cutting the sheet along a line extending parallel to the travel direction of the sheet as the sheet leaves said copying means and travels to said delivery station; and activating means operable by the user of the machine for activating said cutting means.

5. An electrostatic or xerographic copying or duplicating machine, comprising, in combination, supporting means for supporting an original to be copied in a predetermined position; a delivery station for copies; transport means for transporting a sheet of copying paper through the machine in a predetermined travel direction along a predetermined travel path and into said delivery station; copying means for illuminating the original and forming an image thereof on the sheet of copying paper as the latter travels along said path; cutting means arranged upstream of said delivery station, said cutting means comprising a plurality of cutter units spaced from each other in direction transverse to the sheet travel direction and each operative when activated for cutting the sheet along a respective one of a plurality of different cut lines each extending parallel to the travel direction as the sheet leaves said copying means and travels to said delivery station; and activating means operable by user of the machine for activating said cutting means, said activating means comprising means for selecting the lines along which the sheet is to be cut.

* * * * *